(12) United States Patent
Mohan (10) Patent No.: US 10,102,360 B2
(45) Date of Patent: Oct. 16, 2018

(54) USER AUTHENTICATION BASED ON TIME VARIANT FINGERPRINT SEQUENCES

(71) Applicant: CA, INC., New York, NY (US)

(72) Inventor: Badrinath Mohan, Bangalore (IN)

(73) Assignee: CA, INC., New York, NY (US)

( * ) Notice: Subject to any disclaimer, the term of this patent is extended or adjusted under 35 U.S.C. 154(b) by 109 days.

(21) Appl. No.: 14/988,167

(22) Filed: Jan. 5, 2016

(65) Prior Publication Data

US 2017/0193209 A1 Jul. 6, 2017

(51) Int. Cl.
G06F 21/31 (2013.01)
G06F 21/32 (2013.01)

(52) U.S. Cl.
CPC ........... *G06F 21/32* (2013.01); *G06F 21/316* (2013.01)

(58) Field of Classification Search
CPC ............................... G06F 21/32; G06F 21/316
USPC ...................................................... 726/4, 28
See application file for complete search history.

(56) References Cited

U.S. PATENT DOCUMENTS

| | | | | |
|---|---|---|---|---|
| 7,706,581 B2* | 4/2010 | Drews | ............... | G06K 9/00026 382/100 |
| 8,151,334 B2* | 4/2012 | Lauper | .................... | G06F 21/34 713/186 |
| 8,605,959 B2* | 12/2013 | Kangas | ................. | G06F 21/316 382/124 |
| 9,836,591 B2* | 12/2017 | Archibald | ............... | G06F 21/32 |
| 2001/0036299 A1* | 11/2001 | Senior | ................... | G06F 1/1616 382/124 |
| 2013/0333020 A1* | 12/2013 | Deshpande | ............. | G06F 21/36 726/16 |
| 2014/0053238 A1* | 2/2014 | Brannon | ............. | H04L 63/0861 726/1 |
| 2015/0074615 A1* | 3/2015 | Han | .................... | G06K 9/00033 715/863 |
| 2015/0169931 A1* | 6/2015 | Chiang | ................ | G06K 9/0012 382/124 |
| 2015/0220723 A1* | 8/2015 | George | ................... | G06F 21/36 726/19 |

(Continued)

OTHER PUBLICATIONS

A topology-based matching algorithm for fingerprint authentication, Chen et el, 10.1109/CCST.1991.202195, (Year: 1991).*

(Continued)

*Primary Examiner* — Jahangir Kabir
(74) *Attorney, Agent, or Firm* — Sage Patent Group (57) ABSTRACT

An electronic device includes a fingerprint detector sensor, a processor, and a memory coupled to the processor. The memory stores computer readable program code that when executed by the processor causes the processor to perform operations. The operations include receiving a sequence of digital fingerprint scans from the fingerprint detector sensor. The operations further include selectively allowing electronic access by a user to an application processed by the processor based on determining a combination of whether the digital fingerprint scans match a defined number of digital fingerprints stored in a data structure residing in the memory and whether an order of the digital fingerprint scans in the sequence matches a registered order of the defined number of digital fingerprints.

20 Claims, 4 Drawing Sheets

(56) References Cited

U.S. PATENT DOCUMENTS

2016/0147987 A1* 5/2016 Jang .................. G06F 21/32
　　　　　　　　　　　　　　　　　　　726/19
2017/0140192 A1* 5/2017 Lo ..................... G06K 9/001

OTHER PUBLICATIONS

Robust rotation estimation of slap fingerprint image for E-Commerce authentication, Li et el, 10.1109/ICITIS.2010.5689623, IEEE, 2010 (Year: 2010).*

* cited by examiner

| Scanned Order | Measured Finger Dwell Time | Measured Elapsed Time Between Ordered Finger Scans |
|---|---|---|
| Pattern 4 | 1 sec | --- |
| Pattern 1 | 3 sec | 1 sec |
| Pattern 5 | 0.5 sec | 4 sec |
| Pattern 3 | 2 sec | 2 sec |

FIG. 3a

| Registered Order | Registered Finger Dwell Time | Registered Elapsed Time Between Ordered Fingers |
|---|---|---|
| Pattern 4 | 1 sec | --- |
| Pattern 1 | 3 sec | 1 sec |
| Pattern 5 | 0.5 sec | 4 sec |
| Pattern 3 | 2 sec | 2 sec |

Authentication Data Structure

USER AUTHENTICATION BASED ON TIME VARIANT FINGERPRINT SEQUENCES

BACKGROUND

The present disclosure relates to electronic devices and, more particularly, to user interfaces for portable electronic devices.

Passwords remain the dominant approach for user authentication by computer systems because of their simplicity, legacy deployment and ease of revocation. Unfortunately, common approaches to entering passwords by way of keyboard, mouse, touch screen or any traditional input device, are vulnerable to attacks such as shoulder surfing and password snooping.

Shoulder-surfing is an attack on password authentication that has traditionally been hard to defeat. It can be done remotely using binoculars and cameras, using keyboard acoustics, or embedded keystroke tracking software. Access to the user's password simply by observing the user entering a password undermines the effort of encrypting passwords and protocols for authenticating the user securely. To some extent, the human actions when inputting the password are the weakest link in the chain.

Biometric authentication approaches, which identify individuals based on physiological characteristics, have the advantage that they are harder to replicate and therefore are not susceptible to the risks of shoulder surfing. However, biometric techniques suffer from the drawback that physiological characteristics are nonsecret and non-revocable. While it is easy for a user to change a password, it is perhaps not possible for the user to change a fingerprint.

SUMMARY

Some embodiments of the present disclosure are directed to a method of performing operations on a processor of an electronic device. The operations include receiving a sequence of digital fingerprint scans from a fingerprint detector sensor. The operations further include selectively allowing electronic access by a user to an application processed by the processor of the electronic device based on determining a combination of whether the digital fingerprint scans match a defined number of digital fingerprints stored in a data structure residing in a memory and whether an order of the digital fingerprint scans in the sequence matches a registered order of the defined number of digital fingerprints.

In some further embodiments, the determination of whether the digital fingerprint scans match a defined number of digital fingerprints stored in a data structure residing in a memory and whether an order of the digital fingerprint scans in the sequence matches a registered order of the defined number of digital fingerprints, can include determining whether each of the digital fingerprint scans in the sequence matches a different one of the digital fingerprints stored in the data structure and an order of the matching occurs in the registered order.

In some further embodiments, the determination of whether an order of the digital fingerprint scans in the sequence matches a registered order of the defined number of digital fingerprints, includes measuring a sequence of angular rotation offsets between adjacent pairs of the digital fingerprint scans in the sequence, and determining whether the sequence of angular rotation offsets matches a registered sequence of angular rotation offsets that is stored in the data structure.

Some other embodiments of the present disclosure are directed to an electronic device that includes a fingerprint detector sensor, a processor, and a memory coupled to the processor. The memory stores computer readable program code that when executed by the processor causes the processor to perform operations. The operations include receiving a sequence of digital fingerprint scans from the fingerprint detector sensor. The operations further include selectively allowing electronic access by a user to an application processed by the processor based on determining a combination of whether the digital fingerprint scans match a defined number of digital fingerprints stored in a data structure residing in the memory and whether an order of the digital fingerprint scans in the sequence matches a registered order of the defined number of digital fingerprints.

Other methods, electronic devices, and computer program products according to embodiments will be or become apparent to one with skill in the art upon review of the following drawings and detailed description. It is intended that all such additional methods, electronic devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, password entry remains a weakness in efforts to improve user authentication effectiveness. Some electronic devices authenticate users using digital fingerprint scans. One security weakness with this approach is that fingerprints are not secret, and can be easily observed and may be replicated to obtain unauthorized access to such electronic devices. Moreover, fingerprint authentication operations provide a single factor authentication, i.e., where the scanned fingerprint matches the registered fingerprint or it does not.

Various embodiments of the present disclosure are directed to providing improved fingerprint authentication operations that perform matching of digital fingerprint scans to register digital fingerprints, in combination with matching a registered order of the scanned fingers and/or matching registered angular rotation offsets between the scanned fingers. These operations provide multi-factor authentication for fingerprint-based access control to electronic devices. The order of scanned fingers and the angular rotation offset between the scanned fingers can be registered and stored in a data structure in a memory of the electronic device during a registration process, and maintained as a secret by the authentic user (e.g., registered owner of the electronic device and/or an application processed by the electronic device). Accordingly, replication of the fingerprint of the authentic user by a fraudster may satisfy one but not all the required multi-factor authentication operations, so the electronic device would be prevent access to an application or other content of the electronic device.

Figure 1:
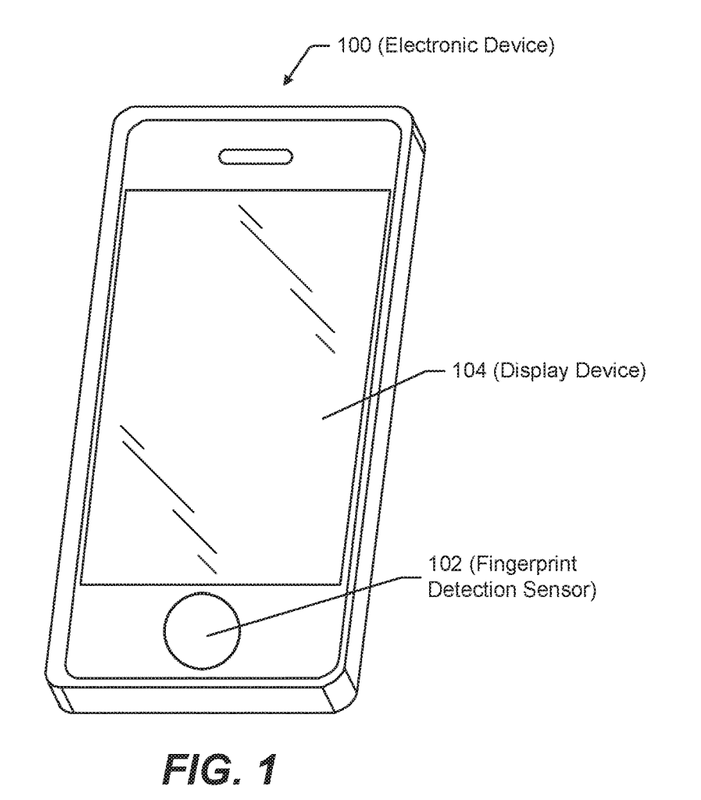
FIG. 1 illustrates an electronic device that authenticates a user who is operating the user terminal based on time variant fingerprint sequences according to some embodiments of the present disclosure.

FIG. 1 illustrates an electronic device 100 that authenticates a user based on time variant fingerprint sequences according to some embodiments of the present disclosure. Referring to FIG. 1, the electronic device 100 includes a display device 104 and a fingerprint detection sensor 102. The electronic device 100 can include, but is not limited to, a smartphone, a tablet computer, a media player, a personal computer, a gaming console, and/or another type of user operable device. The fingerprint detection sensor 102 is configured to electronically scan a user's fingerprint to output a digital fingerprint scan. A processor of electronic device receives a sequence of digital fingerprint scans from the fingerprint detector sensor 102, and selectively allows electronic access by the user to an application processed by the processor based on determining a combination of whether the digital fingerprint scans match a defined number of digital fingerprints stored in an authentication data structure residing in a memory and whether an order of the digital fingerprint scans in the sequence matches a registered order of the defined number of digital fingerprints.

Figure 2:
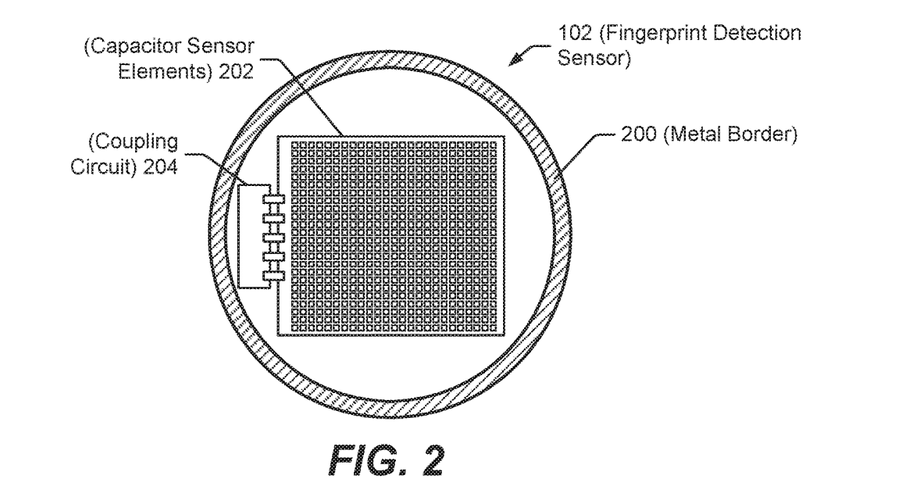
FIG. 2 illustrates a fingerprint detection sensor configured according to some embodiments of the present disclosure.

FIG. 2 illustrates the fingerprint detection sensor 102 configured according to some embodiments of the present disclosure. Referring to FIG. 2, the fingerprint detection sensor 102 may include an array of capacitive sensor elements 202, an optical sensor, an infrared sensor, a thermal sensor, or other fingerprint imaging technology to output a multi-dimensional, e.g., 2 dimensional, digital representation of a user's fingerprint. In the illustrated embodiment, the capacitive sensor elements 202 are arranged in a 2 dimensional array and are each connected to coupling circuit 204, e.g., amplifier circuit and analog-to-digital converter, which outputs a digital fingerprint scan of a finger. The digital fingerprint scan is provided to a processor in the electronic device 100 for authentication of the user in accordance with one or more of the embodiments herein. In some embodiments, the sensor 102 includes a metal border, e.g., ring, 200 that can be supplied with a voltage to enhance capacitive coupling between the user's finger and the capacitive sensor elements 202 or may be grounded to shield the elements 202 from external electromagnetic interference.

The array of capacitive sensor elements 202 outputs a digital fingerprint scan of a user's finger. The scan can contain an array of capacitance values measured by the elements 202 based on capacitive coupling to the ridges and valleys of the epidermis layer of the finger which form a fingerprint. In some other embodiments, the array of capacitive sensor elements 202 is configured to capacitively couple to a subdermal layer of the user's finger, such as to the small blood vessels and tissue structure within the skin of the finger. The capacitance values from the capacitive sensor elements 202 contained in a digital fingerprint scan can be processed by the processor as a grayscale image of the fingerprint to identify features that are compared against a fingerprint that has been earlier registered by an authentic user in an authentication data structure stored in a memory of the electronic device 100 during a registration process for the electronic device 100 and/or an application processed by the electronic device 100.

A user is authenticated by the processor of the electronic device 100 based on whether the user scans different fingers with the fingerprint detector sensor 102 to generate digital fingerprint scans which match registered fingerprint scans that have been earlier registered in the authentication data structure. Moreover, according to some embodiments, the user is authenticated based on the fingers being scanned in a sequential order that has been earlier registered in the authentication data structure. Thus, in some embodiments, the processor of the electronic device can be configured to selectively allow electronic access by a user to an application processed by the processor of the electronic device based on determining a combination of whether the digital fingerprint scans match a defined number of digital fingerprints stored in the authentication data structure and whether an order of the digital fingerprint scans in the sequence matches a registered order of the defined number of digital fingerprints.

Authentication of the user may be further based on whether the user maintains contact between individual ones of the fingers and the fingerprint detector sensor 102 for an elapsed time (i.e., dwell time) that matches (e.g., is within a threshold range of) a registered finger dwell time that has been earlier registered in the authentication data structure. The registered finger dwell time can be defined to have the same or different values for different ones of the fingers in the scan order. Additionally or alternatively, the authentication of the user may be further based on whether the user's finger contacts the sensor 102 with timing between different scans of fingers in the defined order to provide an elapsed time (i.e., "elapsed time between order finger scans") that matches (e.g., is within a threshold range of) a registered elapsed time between order finger scans that has been earlier registered in the authentication data structure. The registered elapsed time between the ordered finger scans can be defined to have the same or different elapsed times between each pair of adjacent scans in the defined order.

Accordingly, a fraudster may be able to replicate the fingerprints of enough fingers of the authentic user for digital scanning by the sensor 102 to satisfy the authentication requirement that the digital fingerprint scans match registered fingerprint scans stored in the authentication data structure. However, the fraudster would not know the required order in which the fingerprints must be scanned, since that order is secret to the authentic user. Moreover, the fraudster would not know the registered finger dwell time during which individual fingers must maintain contact with the fingerprint detector sensor, since that dwell time is again secret to the authentic user. Furthermore, the fraudster would not know the registered elapsed time that must occur between the fingerprint scans since that registered elapsed time is again secret to the authentic user. The fraudster would therefore not be able to successfully complete authentication and would consequently be prevented from accessing content of the electronic device.

Figure 3A:
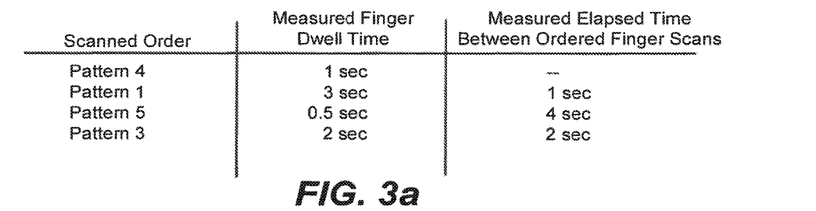
FIG. 3a illustrates information determined from a sequence of digital fingerprint scans of different user fingers according to some embodiments of the present disclosure.
Figure 3B:
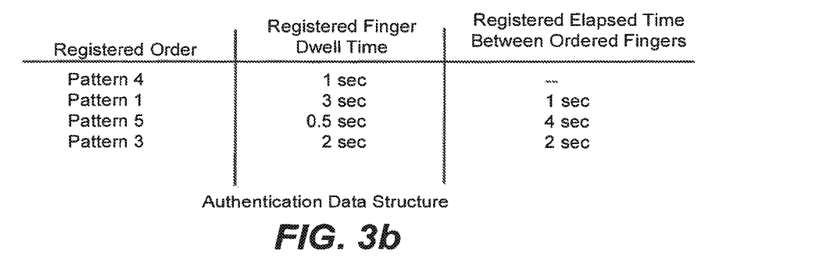
FIG. 3b illustrates information contained in an authentication data structure that is used to authenticate the user based on comparisons to information determined from the digital fingerprint scans of FIG. 3a, according to some embodiments of the present disclosure.
Figure 4:
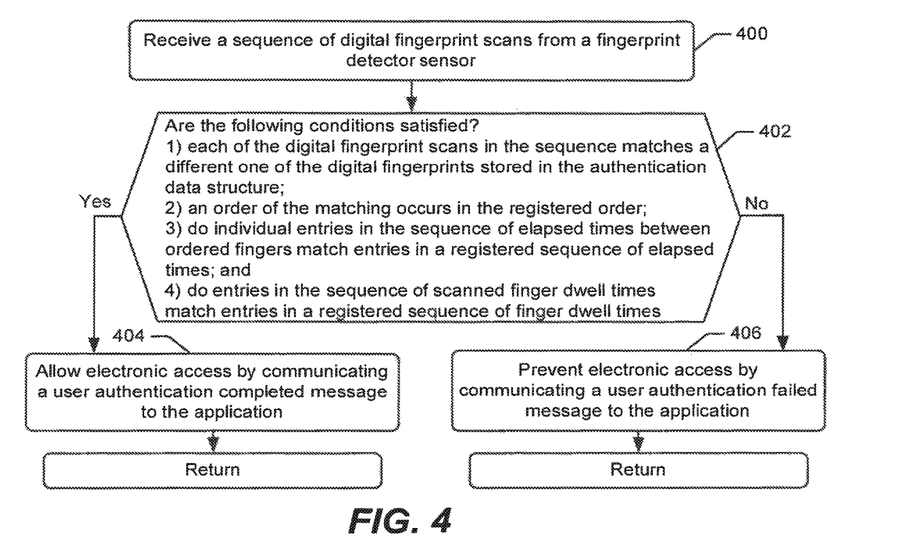
FIG. 4 is a flowchart of operations that can be performed by a processor of the electronic device to authenticate the user based on fingerprint information, such as shown in FIGS. 3a and 3b, according to some embodiments of the present disclosure.

FIG. 3a illustrates information that the process has determined from a sequence of digital fingerprint scans of different user fingers according to some embodiments of the present disclosure. FIG. 3b illustrates information that is contained in an authentication data structure which is used to authenticate the user based on comparisons to information determined from the digital fingerprint scans of FIG. 3a, according to some embodiments of the present disclosure. FIG. 4 is a flowchart of operations that can be performed by the processor of the electronic device 100 to authenticate the user based on fingerprint information, such as shown in FIGS. 3a and 3b, according to some embodiments of the present disclosure.

Referring to FIGS. 3a, 3b, and 4, the processor receives (block 400) a sequence of digital fingerprint scans from the fingerprint detector sensor 102. The digital fingerprint scans contain information corresponding to a sequence of scanned figures having a fingerprint pattern 4 (e.g., ring finger), a fingerprint pattern 1 (e.g., thumb finger), a fingerprint pattern 5 (e.g., little finger), and then a fingerprint pattern 3 (e.g., middle finger). In some further embodiments, the processor measures finger dwell times during which individual ones of the sequence of fingers were statically maintained in contact with the fingerprint detector sensor 102 so that periodic fingerprint scans by the sensor 102 continue to match the same digital fingerprint stored in the authentication data structure for the duration of the measured dwell time. The processor may alternatively or additionally measure the elapsed times between the ordered finger scans, which correspond to the elapsed times between receiving individual ones of the digital fingerprint scans in the sequence. Although FIGS. 3a and 3b illustrate 4 different fingers being scanned for authentication, any plural number fingers may be required in an order for authentication and any finger may be registered for repeated occurrence in the order.

In the embodiment of FIG. 3a, the processor measured a 1 second dwell time for the finger having pattern 4, and then measured a 3 second dwell time for the finger having pattern 1 and measured a 1 second elapsed time between when the pattern 4 finger was removed from the sensor 102 and the pattern 1 finger was placed on the sensor 102. The processor subsequently measured a 0.5 second dwell time for the finger having pattern 5 and measured a 4 second elapsed time between when the pattern 1 finger was removed from the sensor 102 and the pattern 5 finger was placed on the sensor 102. The processor subsequently measured a 2 second dwell time for the finger having pattern 3 and measured a 2 second elapsed time between when the pattern 5 finger was removed from the sensor 102 and the pattern 3 finger was placed on the sensor 102.

The processor determines (block 402) whether one or more defined conditions are satisfied by comparison of the measured information, e.g., shown in FIG. 3a, to the registered information, e.g., shown in FIG. 3b, and controls electronic access to an application processed by the processor responsive thereto. In the example of FIG. 3b, an authentic user has registered in the authentication data structure, which may be stored in a memory of the electronic device 100, an order in which the fingers must be scanned for authentication, has registered the finger dwell time for each of those fingers that is required for authentication, and has registered the elapsed time between scanning of the ordered fingers that is required for authentication.

Authentication performed by the processor includes determining (block 402) whether each of the digital fingerprint scans in the sequence matches a different one of the digital fingerprints stored in the authentication data structure, and whether the scanned order of the matching (e.g., FIG. 3a) matches a registered order of the defined number of digital fingerprints (e.g., FIG. 3b) stored in the authentication data structure. Authentication may furthermore include determining whether an order of the matching occurs in the registered order, whether individual entries in the sequence of elapsed times between ordered fingers matches (e.g., is within a threshold value of) entries in a registered sequence of elapsed times (e.g., FIG. 3b) stored in the authentication data structure, and/or whether entries in the sequence of scanned finger dwell times matches (e.g., are within a threshold value of) entries in a registered sequence of finger dwell times (e.g., FIG. 3b) stored in authentication data structure, as will be explained in further detail below.

The processor selectively allows electronic access by a user to an application processed by the processor based on whether the conditions in block 402 are satisfied. In one embodiment, the processor receives, from a user through a user interface of the electronic device 100, a command to login to the application. The processor allows (block 404) electronic access by communicating a user authentication completed message to the application responsive to determining that all of the determined conditions in block 402 are satisfied. In sharp contrast, the processor prevents (block 406) electronic access by communicating a user authentication failed message to the application responsive to determining that one or more of the determined conditions in block 402 is not satisfied. When the user is properly authenticated, the processor may login a user to the application or otherwise operate the application to obtain and display secured information to the user and/or provide the user with operational access to a physical hardware resource (e.g., keyboard, network interface, etc.) of the electronic device 100. In contrast, when the user is not properly authenticated, the processor may prevent the user from logging into the application or otherwise operate the application to prevent secured information from being displayed to the user and/or prevent the user from operationally accessing a physical hardware resource (e.g., keyboard, network interface, etc.) of the electronic device 100.

In some additional or alternative embodiments, authentication of the user may be based on whether the user rotates a finger between different angular rotational offsets while maintaining contact with the print detector scanner 102 and/or between repetitive finger contacts with the fingerprint print detector scanner 102, so that the processor measures a sequence of angular rotational offsets between the sequence of digital fingerprint scans that matches (e.g., are within a threshold value of) a sequence of registered angular rotational offsets that have been earlier stored in the authentication data structure.

The authentication can be further based on the processor determining that the user has maintained the rotational offset of a finger for an elapsed time (i.e., dwell time) that matches (e.g., is within a threshold range of) a registered finger dwell time that has been earlier registered in the authentication data structure. The registered finger dwell time can be defined to have different dwell time values for different ones of the sequence of registered angular rotational offsets. Additionally or alternatively, the authentication of the user may be further based on whether the user controls timings between changes to the rotational offset of a finger relative to the sensor 102 to provide an elapsed time (i.e., "measured elapsed times between angular offsets") that matches (e.g., is within a threshold range of) a registered elapsed time between change to the angular of the finger relative to the sensor 102 (i.e., "registered elapsed times between angular offsets") that has been earlier registered in the authentication data structure. The registered elapsed times between angular offsets can be defined to have different elapsed times between each pair of rotational offsets in the sequence.

Thus, again, a fraudster may be able to replicate the fingerprint of a finger of the authentic user for digital scanning by the sensor 102 to satisfy the authentication requirement that the digital fingerprint scan match a registered fingerprint scan stored in the authentication data structure. However, the fraudster would not know a sequence of angular rotational offsets through which the finger is required to be rotated, since that sequence is secret to the authentic user. Moreover, the fraudster would not know the registered finger dwell time during which an angular rotational offset is maintained with the fingerprint detector sensor 102, since that dwell time is again secret to the authentic user. Furthermore, the fraudster would not know the registered elapsed time that must occur between angular offsets since that registered elapsed time is again secret to the authentic user. The fraudster would therefore be prevented from accessing content on the electronic device.

Figure 5A:
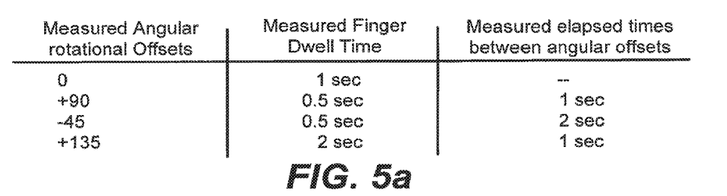
FIG. 5a illustrates information determined from a sequence of digital fingerprint scans having angular rotation offsets between them according to some embodiments of the present disclosure.
Figure 5B:
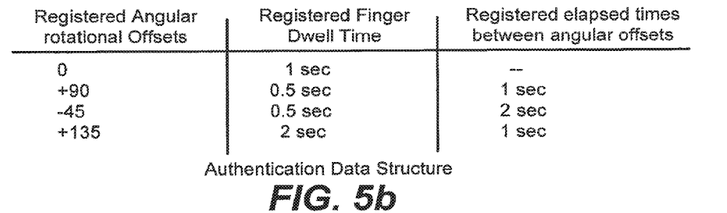
FIG. 5b illustrates information contained in an authentication data structure that is used to authenticate the user based on comparisons to information determined from the digital fingerprint scans of FIG. 5a, according to some embodiments of the present disclosure.
Figure 6:
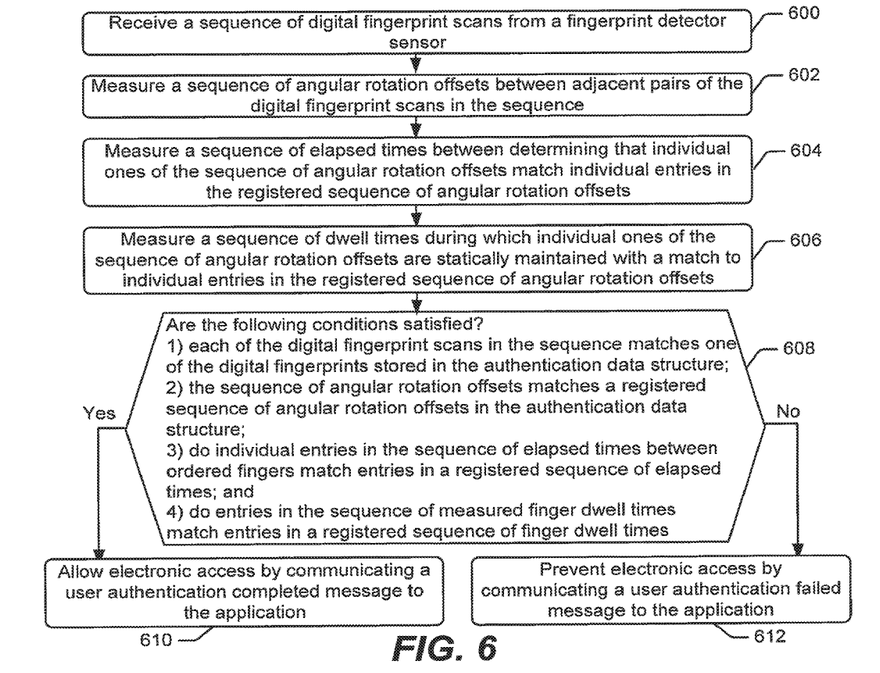
FIG. 6 is a flowchart of operations can be performed by a processor of the electronic device to authenticate the user based on fingerprint information, such as shown in FIGS. 5a and 5b, according to some embodiments of the present disclosure.

FIG. 5a illustrates information determined from a sequence of digital fingerprint scans of different user fingers according to some embodiments of the present disclosure. FIG. 5b illustrates information contained in an authentication data structure that is used to authenticate the user based on comparisons to information determined from the digital fingerprint scans of FIG. 5a, according to some embodiments of the present disclosure. FIG. 6 is a flowchart of operations that can be performed by a processor of the electronic device 100 to authenticate the user based on fingerprint information, such as shown in FIGS. 5a and 5b, according to some embodiments of the present disclosure.

Referring to FIGS. 5a, 5b, and 6, the processor receives (block 600) a sequence of digital fingerprint scans from the fingerprint detector sensor 102. The digital fingerprint scans may be generated at a defined rate by the sensor 102 and/or generated based on sensing new contact of a finger with the sensor 102. Thus, for example, the user may repetitively touch the sensor 102 with a same finger that is rotated between touches to various relative angles defined with respect to a coordinate system of the sensor 102 in order to attempt to match the registered angular rotational offsets, and/or the user may sequentially touch the sensor 102 with different fingers that are rotated between touches to various relative angles defined with respect to the coordinate system of the sensor 102 in order to attempt to match the registered angular rotational offsets.

The processor measures (block 602) a sequence of angular rotation offsets between adjacent pairs of the digital fingerprint scans in the sequence. When the fingerprint detector sensor 102 includes the array of capacitive sensor elements 202, the processor can receive a digital fingerprint scan of a user's finger that is represented by an array of capacitance values indicating an amount of capacitive coupling between individual ones of the elements 202 and the ridges and valleys of the epidermis layer of the finger and/or internal semiconductive structure of the subdermal layer of the finger, such as to the small blood vessels and tissue structure within the skin of the finger. The processor may compare the array of capacitance values in one of the digital fingerprint scans to the array of capacitance values of another one of digital fingerprint scans to identify a pattern of matching ones of the capacitance values in both arrays, and identify the angular rotation offset based on an angular difference between the patterns in both arrays. For example, the processor may perform an edge detection operation on the capacitance values in a digital fingerprint scan to identify one or more features of the fingerprint for matching.

In the example of FIG. 5a, the processor measures an initial angular rotational offset of 0 degrees between a finger and a coordinate system of the sensor 102 formed by the array of capacitive sensor elements 202, then measures an angular rotational offset of 90 degrees relative to the coordinate system of the sensor 102 or relative to the previous finger orientation, followed by measuring an angular rotational offset of −45 degrees relative to the coordinate system of the sensor 102 or relative to the previous finger orientation, and then measuring an angular rotational offset of 135 degrees relative to the coordinate system of the sensor 102 or relative to the previous finger orientation.

In some further embodiments, the processor measures (block 604) a sequence of elapsed times between determining that individual ones of the sequence of angular rotation offsets match individual entries in the registered sequence of angular rotation offsets, i.e., "measured elapsed times between angular offset" in FIG. 5a. The processor may alternatively or additionally measure (block 606) a sequence of dwell times during which individual ones of the sequence of angular rotation offsets are statically maintained with a match to individual entries in the registered sequence of angular rotation offsets, i.e., "measured finger dwell time" in FIG. 5a.

The processor determines (block 608) whether one or more defined conditions are satisfied by comparison of the measured information, e.g., shown in FIG. 5a, to the registered information, e.g., shown in FIG. 5b, and controls electronic access to an application processed by the processor responsive thereto. In the example of FIG. 5b, an authentic user has registered in the authentication data structure, which may be stored in a memory of the electronic device 100, a sequence of angular rotational offsets that a scanned finger must satisfy for authentication ("registered angular rotational offsets"). The authentic user has also registered the finger dwell time for each of those angular rotational offsets that is required for authentication ("registered finger dwell time"), and has registered the elapsed time between scanning fingers having the angular rotational offsets that is required for authentication ("registered elapsed times between angular offsets").

The authentication operations performed by the processor include determining (block 402) whether each of the digital fingerprint scans in the sequence matches a same or different one of the digital fingerprints stored in the authentication data structure, and whether the measured angular rotational offset (e.g., FIG. 5a) matches the registered angular rotational offset (e.g., FIG. 5b) stored in the authentication data structure. In some further embodiments, the authentication operations include determining whether the measured finger dwell time (e.g., FIG. 5a) matches (e.g., within a threshold value of) the registered finger dwell time (e.g., FIG. 5b) stored in the authentication data structure. The authentication operations may alternatively or additionally include determining whether the measured elapsed times between angular offsets (e.g., FIG. 5a) match (e.g., within a threshold value of) the registered elapsed times between angular offsets (e.g., FIG. 5b) stored in the authentication data structure.

In the embodiment of FIG. 6, the processor determines (block 608) whether the following conditions are satisfied: 1) whether each of the digital fingerprint scans in the sequence matches one of the digital fingerprints stored in the authentication data structure; 2) whether the sequence of measured angular rotational offsets matches the registered sequence of angular rotational offsets an authentication data structure; 3) whether individual entries in the sequence of measured elapsed times between the ordered fingers match entries in the registered sequence of elapsed times in the authentication data structure; and 4) whether entries in the sequence of measured finger dwell times match entries in the registered sequence of finger dwell times in authentication data structure.

The processor selectively allows electronic access by the user to an application processed by the processor based on whether the conditions in block 608 are satisfied. In one embodiment, the processor receives, from the user through a user interface of the electronic device 100, a command to login to the application. The processor allows (block 610) electronic access by communicating a user authentication completed message to the application responsive to determining that all of the determined conditions in block 608 are satisfied. In sharp contrast, the processor prevents (block 612) electronic access by communicating a user authentication failed message to the application responsive to determining that one or more of the determined conditions in block 608 is not satisfied. When the user is properly authenticated, the processor may login a user to the application or otherwise operate the application to obtain and display secured information to the user and/or provide the user with operational access to a physical hardware resource (e.g., keyboard, network interface, etc.) of the electronic device 100. In contrast, when the user is not properly authenticated, the processor may prevent the user from logging into the application or otherwise operate the application to prevent secured information from being displayed to the user and/or prevent the user from operationally accessing a physical hardware resource (e.g., keyboard, network interface, etc.) of the electronic device 100.

In some further embodiments, the processor of the electronic device 100 determines a combination of whether the digital fingerprint scans match a defined number of digital fingerprints stored in an authentication data structure residing in a memory and whether an order of the digital fingerprint scans in the sequence matches a registered order of the defined number of digital fingerprints, by measuring a sequence of directions between locations of the digital fingerprint scans relative to an array of sensor elements of the fingerprint detector sensor, and determining whether the sequence of directions matches a registered sequence of directions that is stored in the authentication data structure.

Figure 7:
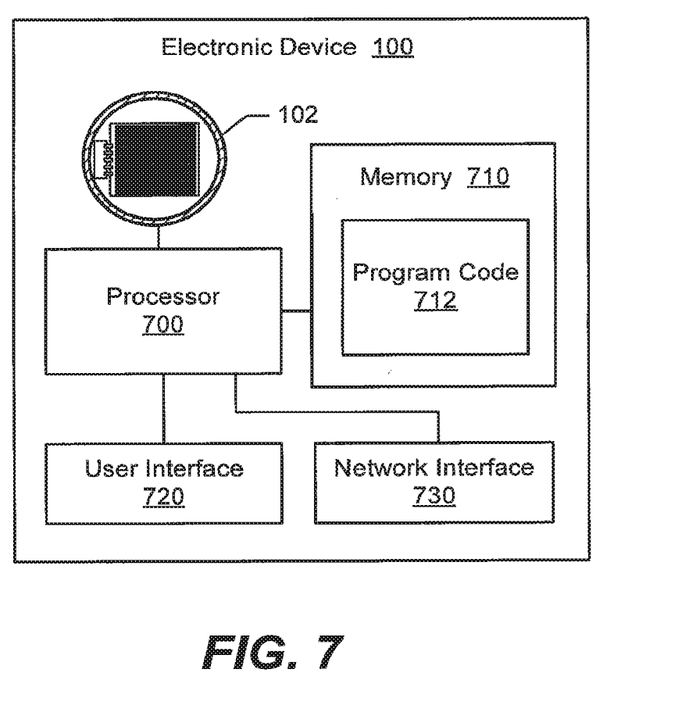
FIG. 7 is a block diagram of an electronic device configured according to some embodiments of the present disclosure.

FIG. 7 is a block diagram of an electronic device 100 configured according to some embodiments of the present disclosure. Referring to FIG. 7, the electronic device 100 includes a fingerprint detector sensor 102, a processor 700, a memory 710, the user interface 720, and a network interface 730. The fingerprint detector sensor 102 may be configured as shown in FIG. 2. The processor 700 may include one or more data processing circuits, such as a general purpose and/or special purpose processor (e.g., microprocessor and/or digital signal processor) that may be collocated within the electronic device 100 or distributed across one or more networks. The processor 700 is configured to execute computer program code 712 in the memory 710, described below as a non-transitory computer readable medium, to perform at least some of the operations described herein as being performed by an electronic device 100 or any component thereof. The user interface 720 may be a display device, a touch input interface on a display device, a keyboard, etc. The network interface 730 may be a wired network interface transceiver, e.g., Ethernet, and/or a wireless radiofrequency transceiver that is configured to operate according to one or more communication protocols, e.g., WiFi, Bluetooth, cellular LTE, etc.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit" "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on a processor of an electronic device:
receiving a sequence of digital fingerprint scans of different individual fingers of a user from a fingerprint detector sensor of the electronic device configured to electronically scan the user's fingerprint to output a digital fingerprint scan;
measuring a sequence of elapsed times and angular rotation offsets between receiving individual ones of the digital fingerprint scans of the different individual fingers of the user in the sequence from the fingerprint detector sensor; and
selectively allowing electronic access by the user to an application processed by the processor of the electronic device based on determining a combination of whether the digital fingerprint scans of the different individual fingers of the user match a defined number of digital fingerprints of the different individual fingers of the user stored in an authentication data structure residing in a memory and whether an order of the digital fingerprint scans of the different individual fingers of the user in the sequence matches a registered order of the defined number of digital fingerprints of the different individual fingers of the user,
wherein the selectively allowing electronic access further comprises determining whether individual entries in the sequence of elapsed times and angular rotation offsets match entries in a registered sequence of elapsed times and angular rotation offsets that are stored in the authentication data structure,
wherein measuring the sequence of angular rotation offsets comprises measuring a sequence of angular rotation offsets between fingerprint patterns of adjacent pairs in the sequence of the digital fingerprint scans from the fingerprint detector sensor in the sequence.

2. The method of claim 1, wherein the determining a combination of whether the digital fingerprint scans match a defined number of digital fingerprints stored in an authentication data structure residing in a memory and whether an order of the digital fingerprint scans in the sequence matches a registered order of the defined number of digital fingerprints, comprises:
determining whether each of the digital fingerprint scans in the sequence matches a different one of the digital fingerprints stored in the authentication data structure and whether an order of the matching occurs in the registered order.

3. The method of claim 2, wherein the selectively allowing electronic access comprises:
receiving, from a user through a user interface of the electronic device, a command to login to the application;
communicating a user authentication failed message to the application responsive to determining that an order of the matching does not occur in the registered order; and
communicating a user authentication completed message to the application responsive to determining that each of the digital fingerprint scans in the sequence matches a different one of the digital fingerprints stored in the authentication data structure and that the order of the matching occurs in the registered order.

4. The method of claim 1,
wherein the determining whether an order of the digital fingerprint scans of the different individual fingers of the user in the sequence matches a registered order of the defined number of digital fingerprints of the different individual fingers of the user, comprises:
determining whether the measured sequence of angular rotation offsets matches a registered sequence of angular rotation offsets that is stored in the authentication data structure.

5. The method of claim 4, wherein the selectively allowing electronic access comprises:
receiving, from a user through a user interface of the electronic device, a command to login to the application;
communicating a user authentication failed message to the application responsive to determining that the sequence of angular rotation offsets does not match a registered sequence of angular rotation offsets; and
communicating a user authentication completed message to the application responsive to determining that the sequence of angular rotation offsets matches a registered sequence of angular rotation offsets.

6. The method of claim 4, further comprising:
measuring a sequence of elapsed times between determining that individual ones of the sequence of angular rotation offsets match individual entries in the registered sequence of angular rotation offsets,
wherein the determining whether an order of the digital fingerprint scans of the different individual fingers of the user in the sequence matches a registered order of the defined number of digital fingerprints of the different individual fingers of the user further comprises determining whether individual entries of the digital fingerprint scans of the different individual fingers of the user in the sequence of elapsed times match entries of the digital fingerprint scans of the different individual fingers of the user in a registered sequence of elapsed times that is stored in the authentication data structure.

7. The method of claim 4, wherein the fingerprint detector sensor comprises a capacitive fingerprint sensor containing an array of capacitive sensor elements, and wherein:
the receiving a sequence of digital fingerprint scans from a fingerprint detector sensor, comprises:
receiving for each of the digital fingerprint scans, an array of capacitance values measured by the array of capacitive sensor elements based on capacitive coupling to fingerprint ridges and valleys of a finger; and
the measuring a sequence of angular rotation offsets between adjacent pairs of the digital fingerprint scans in the sequence, comprises:
for each adjacent pair of the digital fingerprint scans in the sequence, comparing the capacitance values in the array of one of the adjacent pair to the capacitance values in the array of the other one of the adjacent pair to identify a fingerprint pattern of matching ones of the capacitance values in both arrays, and identifying the angular rotation offset based on an angular difference between the fingerprint patterns in both arrays.

8. The method of claim 4, further comprising:
measuring a sequence of dwell times during which individual ones of the sequence of angular rotation offsets are statically maintained with a match to individual entries in the registered sequence of angular rotation offsets, wherein the selectively allowing electronic access further comprises determining whether individual entries in the sequence of dwell times match entries in a registered sequence of dwell times that is stored in the authentication data structure.

9. The method of claim 1, wherein the determining a combination of whether the digital fingerprint scans of the different individual fingers of the user match a defined number of digital fingerprints of the different individual fingers of the user stored in an authentication data structure residing in a memory and whether an order of the digital fingerprint scans of the different individual fingers of the user in the sequence matches a registered order of the defined number of digital fingerprints of the different individual fingers of the user, comprises:

measuring a sequence of directions between locations of the digital fingerprint scans relative to an array of sensor elements of the fingerprint detector sensor; and determining whether the sequence of directions matches a registered sequence of directions that is stored in the authentication data structure.

10. The method of claim 7, wherein the array of capacitive sensor elements form a coordinate system of the fingerprint detector sensor.

11. The method of claim 10, wherein measuring the sequence of angular rotational offsets comprises measuring the angular rotational offset relative to the coordinate system of the fingerprint detector sensor.

12. An electronic device, comprising:
a fingerprint detector sensor configured to electronically scan a user's fingerprint to output a digital fingerprint scan;
a processor; and
a memory coupled to the processor and storing computer readable program code that when executed by the processor causes the processor to perform operations comprising:
receiving a sequence of digital fingerprint scans of different individual fingers of the user from the fingerprint detector sensor;
measuring a sequence of elapsed times and angular rotational offsets between receiving individual ones of the digital fingerprint scans of the different individual fingers of the user in the sequence from the fingerprint detector sensor; and
selectively allowing electronic access by the user to an application processed by the processor of the electronic device based on determining a combination of whether the digital fingerprint scans of the different individual fingers of the user match a defined number of digital fingerprints of the different individual fingers of the user stored in an authentication data structure residing in a memory and whether an order of the digital fingerprint scans of the different individual fingers of the user in the sequence matches a registered order of the defined number of digital fingerprints of the different individual fingers of the user,
wherein the selectively allowing electronic access further comprises determining whether individual entries in the sequence of elapsed times and angular rotational offsets match entries in a registered sequence of elapsed times and angular rotational offsets that are stored in the authentication data structure, and
wherein measuring the sequence of angular rotation offsets comprises measuring a sequence of angular rotation offsets between fingerprint patterns of adjacent pairs in the sequence of the digital fingerprint scans from the fingerprint detector sensor in the sequence.

13. The electronic device of claim 12, wherein the determining a combination of whether the digital fingerprint scans match a defined number of digital fingerprints stored in an authentication data structure residing in the memory and whether an order of the digital fingerprint scans in the sequence matches a registered order of the defined number of digital fingerprints, comprises:
determining whether each of the digital fingerprint scans in the sequence matches a different one of the digital fingerprints stored in the authentication data structure and an order of the matching occurs in the registered order.

14. The electronic device of claim 13, further comprising a user interface, wherein the selectively allowing electronic access comprises:
receiving, from a user through the user interface, a command to login to the application;
communicating a user authentication failed message to the application responsive to determining that an order of the matching does not occur in the registered order; and
communicating a user authentication completed message to the application responsive to determining that each of the digital fingerprint scans in the sequence matches a different one of the digital fingerprints stored in the authentication data structure and that the order of the matching occurs in the registered order.

15. The electronic device of claim 12,
wherein the determining whether an order of the digital fingerprint scans of the different individual fingers of the user in the sequence matches a registered order of the defined number of digital fingerprints of the different individual fingers of the user, comprises:
determining whether the measured sequence of angular rotation offsets matches a registered sequence of angular rotation offsets that is stored in the authentication data structure.

16. The electronic device of claim 15, further comprising a user interface, wherein the selectively allowing electronic access comprises:
receiving, from a user through the user interface, a command to login to the application;
communicating a user authentication failed message to the application responsive to determining that the sequence of angular rotation offsets does not match a registered sequence of angular rotation offsets; and
communicating a user authentication completed message to the application responsive to determining that the sequence of angular rotation offsets matches a registered sequence of angular rotation offsets.

17. The electronic device of claim 15, the operations further comprising:
measuring a sequence of elapsed times between determining that individual ones of the sequence of angular rotation offsets match individual entries in the registered sequence of angular rotation offsets,
wherein the determining whether an order of the digital fingerprint scans of the different individual fingers of the user in the sequence matches a registered order of the defined number of digital fingerprints of the different individual fingers of the user further comprises determining whether individual entries of the digital fingerprint scans of the different individual fingers of the user in the sequence of elapsed times match entries of the digital fingerprint scans of the different individual fingers of the user in a registered sequence of elapsed times that is stored in the authentication data structure.

18. The electronic device of claim 15, wherein the fingerprint detector sensor comprises a capacitive fingerprint sensor containing an array of capacitive sensor elements, and wherein:

the receiving a sequence of digital fingerprint scans from a fingerprint detector sensor, comprises:
    receiving for each of the digital fingerprint scans, an array of capacitance values measured by the array of capacitive sensor elements based on capacitive coupling to fingerprint ridges and valleys of a finger; and
the measuring a sequence of angular rotation offsets between adjacent pairs of the digital fingerprint scans in the sequence, comprises:
    for each adjacent pair of the digital fingerprint scans in the sequence, comparing the capacitance values in the array of one of the adjacent pair to the capacitance values in the array of the other one of the adjacent pair to identify a fingerprint pattern of matching ones of the capacitance values in both arrays, and identifying the angular rotation offset based on an angular difference between the fingerprint patterns in both arrays.

19. The electronic device of claim 15, the operations further comprising:

measuring a sequence of dwell times during which individual ones of the sequence of angular rotation offsets are statically maintained with a match to individual entries in the registered sequence of angular rotation offsets, wherein the selectively allowing electronic access further comprises determining whether individual entries in the sequence of dwell times match entries in a registered sequence of dwell times that is stored in the authentication data structure.

20. The electronic device of claim 12, wherein the determining a combination of whether the digital fingerprint scans of the different individual fingers of the user match a defined number of digital fingerprints of the different individual fingers of the user stored in an authentication data structure residing in the memory and whether an order of the digital fingerprint scans of the different individual fingers of the user in the sequence matches a registered order of the defined number of digital fingerprints of the different individual fingers of the user, comprises:

measuring a sequence of directions between locations of the digital fingerprint scans relative to an array of sensor elements of the fingerprint detector sensor; and
determining whether the sequence of directions matches a registered sequence of directions that is stored in the authentication data structure.

* * * * *